(12) United States Patent
Merrill et al.

(10) Patent No.: US 8,943,423 B2
(45) Date of Patent: Jan. 27, 2015

(54) USER INTERFACE INDICATORS FOR CHANGED USER INTERFACE ELEMENTS

(75) Inventors: Ethan K. Merrill, Durham, NC (US); Valerie M. Bennett, Macon, NC (US)

(73) Assignee: International Business Machines Corporation, Armonk, NJ (US)

( * ) Notice: Subject to any disclaimer, the term of this patent is extended or adjusted under 35 U.S.C. 154(b) by 581 days.

(21) Appl. No.: 12/498,713

(22) Filed: Jul. 7, 2009

(65) Prior Publication Data
US 2011/0010644 A1    Jan. 13, 2011

(51) Int. Cl.
G06F 3/0481    (2013.01)
G06F 9/44    (2006.01)

(52) U.S. Cl.
CPC ..................... G06F 8/34 (2013.01)
USPC ............ 715/762; 715/700; 717/124; 717/125

(58) Field of Classification Search
CPC ............ G06F 3/0481; G06F 8/38; G06F 8/34
USPC .................. 715/761, 762, 859, 861
See application file for complete search history.

(56) References Cited

U.S. PATENT DOCUMENTS

| | | | |
|---|---|---|---|
| 6,760,727 B1 * | 7/2004 | Schroeder et al. | 1/1 |
| 6,859,922 B1 * | 2/2005 | Baker et al. | 717/125 |
| 7,426,734 B2 * | 9/2008 | Debique et al. | 719/310 |
| 7,516,438 B1 * | 4/2009 | Leonard et al. | 717/102 |
| 7,813,816 B2 * | 10/2010 | Fulton et al. | 700/11 |
| 8,296,435 B2 * | 10/2012 | O'Connell, Jr. | 709/226 |
| 8,423,963 B2 * | 4/2013 | Garbers et al. | 717/125 |
| 2004/0103394 A1 * | 5/2004 | Manda et al. | 717/126 |
| 2007/0055932 A1 * | 3/2007 | Glein et al. | 715/526 |
| 2007/0250841 A1 * | 10/2007 | Scahill et al. | 719/320 |
| 2008/0010084 A1 * | 1/2008 | Castro et al. | 705/1 |
| 2008/0127101 A1 * | 5/2008 | Anafi et al. | 717/125 |
| 2009/0037883 A1 * | 2/2009 | Garbers et al. | 717/125 |
| 2010/0191731 A1 * | 7/2010 | Rus et al. | 707/737 |
| 2011/0252405 A1 * | 10/2011 | Meirman et al. | 717/125 |
| 2011/0283257 A1 * | 11/2011 | Charisius et al. | 717/109 |

OTHER PUBLICATIONS

Matthew P. Barnson, "The Bugzilla Guide—Feb. 16, 2011 Release", Feb. 20, 2006, Retrieved online at www.bugzilla.org.*

* cited by examiner

*Primary Examiner* — William Bashore
*Assistant Examiner* — Reza Nabi
(74) *Attorney, Agent, or Firm* — Robert J. Sacco, Esq.; Fox Rothschild LLP

(57) ABSTRACT

Systems and methods for user interface (UI) flagging. The methods involve setting a first visual indicator on or adjacent to a first UI element of a UI when code that generates the first UI element has been added to an application or modified so as to change at least one functional characteristic of the first UI element. The methods also involve setting a second visual indicator on a first UI object of the application when code that generates the first UI object has been modified so as to remove a second UI element therefrom. The visual indicators are set by adding UI flagging code to the code that generates the first UI element and/or first UI object. Also, third visual indicators can be set on or adjacent to second UI objects that have "trails" to the first UI element and/or the first UI object.

18 Claims, 15 Drawing Sheets

USER INTERFACE INDICATORS FOR CHANGED USER INTERFACE ELEMENTS

BACKGROUND

1. Statement of the Technical Field

The present invention relates to computer processing systems. More particularly, the present invention relates to systems and methods for setting user interface indicators on user interface elements of a user interface when code that generates the user interface elements is changed.

2. Description of the Related Art

In code development across all software development, there is a general process that is followed by software developers. First, the software developers write code. The term "code", as used herein, refers to the symbolic arrangement of data or instructions in a computer program or the set of such instructions. At various stages, the code is implemented in an installable and runable product. The installable and runable product is given to one or more groups of software test engineers. The groups of software test engineers typically include Functional Verification Test (FVT) engineers, System Verification Test (SVT) engineers, and Globalization Verification Test (GVT) engineers. The phrase "Functional Verification Test (FVT)" generally refers to a stage of software testing where an entity verifies that a User Interface (UI) functions the way it is designed to function. The phrase "System Verification Test (SVT)" generally refers to a stage of software testing where an entity verifies that a UI works with any other software that is included as part of a full product being sold. The phrase "Globalization Verification Test (GVT)" refers to a stage of software testing where an entity verifies that displayed text of a UI element accurately translates from a first language (e.g., English) to a second language of choice (e.g., Japanese). The phrase "User Interface (UI)" refers to any software application that has a visual interface that facilitates user-software interactions for accomplishing pre-defined task(s). The UIs typically include, but are not limited to, INTERNET EXPLORER®, FIREFOX®, MICROSOFT® Word, and QUICKBOOKS®.

The software test engineers often face various challenges when performing FVTs, SVTs, GVTs and/or other types of software testing processes. Various challenges occur between code drops. The phrase "code drop" refers to a stage when at least one software developer completes an iteration of an installable and runable product and provides the product to persons that are to test the software (e.g., software test engineers). Upon receipt of the new iteration of the product, each group of software test engineers determines what parts of the product need to be tested for defects. An exemplary defect occurs when a mouse click on a "FileOpen" button causes a software program to crash. These determinations generally involve identifying UI elements that have been added to the product, identifying existing UI elements that have been changed, and/or identifying existing UI elements that have been removed from the product.

Various conventional methods are typically employed by an entity to test a product for defects. One such conventional method generally involves utilizing a tool facilitating automated testing of UIs implemented in a product. For example, a software test engineer installs an iteration of a product on a Personal Computer (PC). Thereafter, the software test engineer runs a test software application. The test software application is typically operative to automatically move a mouse, click on graphical elements of Graphical User Interfaces (GUIs), enter text in text based interfaces, and validate results of certain actions. The result validation is made using data indicating proper results for certain automated actions. This data is provided by the software test engineer. The automated test script is modified each time layout of graphical elements (e.g., buttons) is changed by the software developer.

Another conventional method is a "word of mouth" approach. This approach generally involves generating a list of features (e.g., a bookmark feature) that were implemented in the product by the software developer. The software developer provides the list of features to each groups of software test engineers. Thereafter, the software test engineers test each feature identified in the list for defects.

Another conventional method is a Full Regression Test (FRT) approach. The FRT approach generally involves testing all functions of a product relative so that function change, addition or removal in any new iterations are sure to be covered.

BRIEF SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

Embodiments of the present invention relate to computer implemented methods for user interface flagging. The methods involve setting at least one first visual indicator on or adjacent to at least one first user interface element of a user interface when code that generates the first user interface element has been added to a software application or modified so as to change at least one of a visual characteristic, an auditory characteristic, and a functional characteristic of the first user interface element. The visual characteristic includes, but is not limited to, a color scheme of a visual element, content of supporting text label(s) to be displayed with the visual element, a font size of the supporting text label, a font style of the supporting text label, and a pictorial representation to be displayed with the visual element. The auditory characteristic includes, but is not limited to, a sound output when certain events occur (e.g., when a visual element is displayed on a display screen and/or when a visual element is clicked by a user of a computing device). The functional characteristic includes, but is not limited to, an ability to cause certain event or acts to occur in response to certain user-software interactions (e.g., to cause a file to be transferred from a first storage device to a second storage device when a user clicks on a button). The first visual indicator is set by adding UI flagging code to the code that generates the first user interface element. The UI flagging code can be operative to cause the first user interface element to appear with a select border, to cause text of the first user interface element to appear in a select font, to cause the text of the first user interface element to flash, to cause the text of the first user interface element to appear in a select color, and/or to cause a sound to be output when the first user interface element is clicked.

The methods also involve setting at least one second visual indicator on or adjacent to at least one first user interface object containing the first user interface element. The first user interface object can include, but is not limited to, a window or container. The second visual indicator is set by adding UI flagging code to the code that generates the first user interface object. At least one third visual indicator can be set on or adjacent to at least one second user interface object containing the first user interface object or having a trail to the first user interface object. The third visual indicator is set by adding UI flagging code to the code that generates the second user interface object. The second user interface object can include, but is not limited to, a window or container. The UI flagging code can be operative to cause the user interface objects to appear with a select border, to cause text of the user interface objects to appear in a select font, to cause the text of the user interface objects to flash, to cause the text of the user interface objects to appear in a select color, or to cause a sound to be output when the user interface objects are displayed on a display screen. Notably, UI flagging code is added to code that generates user interface object unit all containing user interface objects have been accounted for by an application (e.g., a software development application) or a person (e.g., a software developer).

Upon the occurrence of certain events or acts (e.g., the clicking of a button), the UI flagging indicators can be removed from the UI. Also, a UI flagging setting can be removed from a software development project. Further, information can be collected that is useful for building a record of visual indicators for each build of an application.

The methods further involve setting at least one fourth visual indicator on at least one third user interface object of an application when code that generates the first user interface object has been modified so as to remove a second user interface element from the third user interface object. The fourth visual indicator can be set by adding UI flagging code to the code that generates the third user interface object. The UI flagging code can be operative to cause the third user interface object to appear with a select border, to cause text of the third user interface object to appear in a select font, to cause the text of the third user interface object to flash, to cause the text of the third user interface object to appear in a select color, or to cause a sound to be output when the third user interface object is displayed on a display screen. Upon the occurrence of certain events or acts (e.g., the closing of a window or the clicking of a button), the UI flagging setting can be removed from the software development project.

Embodiments of the present invention also relate to a system comprising at least one processing device implementing the above described methods. Accordingly, the processing device is configured for setting the first visual indicator on or adjacent to the first user interface element of a user interface when code that generates the first user interface element has been added to a software application or modified so as to change at least one of a visual characteristic, an auditory characteristic, and a functional characteristic of the first user interface element. The visual characteristic includes, but is not limited to, a color scheme of a visual element, content of supporting text label(s) to be displayed with the visual element, a font size of the supporting text label, a font style of the supporting text label, and a pictorial representation to be displayed with the visual element. The auditory characteristic includes, but is not limited to, a sound output when certain events occur (e.g., when a visual element is displayed on a display screen and/or when a visual element is clicked by a user of a computing device). The functional characteristic includes, but is not limited to, an ability to cause certain event or acts to occur in response to certain user-software interactions (e.g., to cause a file to be transferred from a first storage device to a second storage device when a user clicks on a button). The processing device is also configured for setting the second visual indicator on at least one first user interface object of the software application when code that generates the first user interface object has been modified so as to remove a second user interface element from the first user interface object. The processing device is further configured for collecting information that is useful for building a record of visual indicators for each build of an application. The processing device is configured for removing the UI flagging setting from the software development project.

BRIEF DESCRIPTION OF THE SEVERAL VIEWS OF THE DRAWINGS

Embodiments will be described with reference to the following drawing figures, in which like numerals represent like items throughout the figures, and in which.

DETAILED DESCRIPTION

Figure 1:
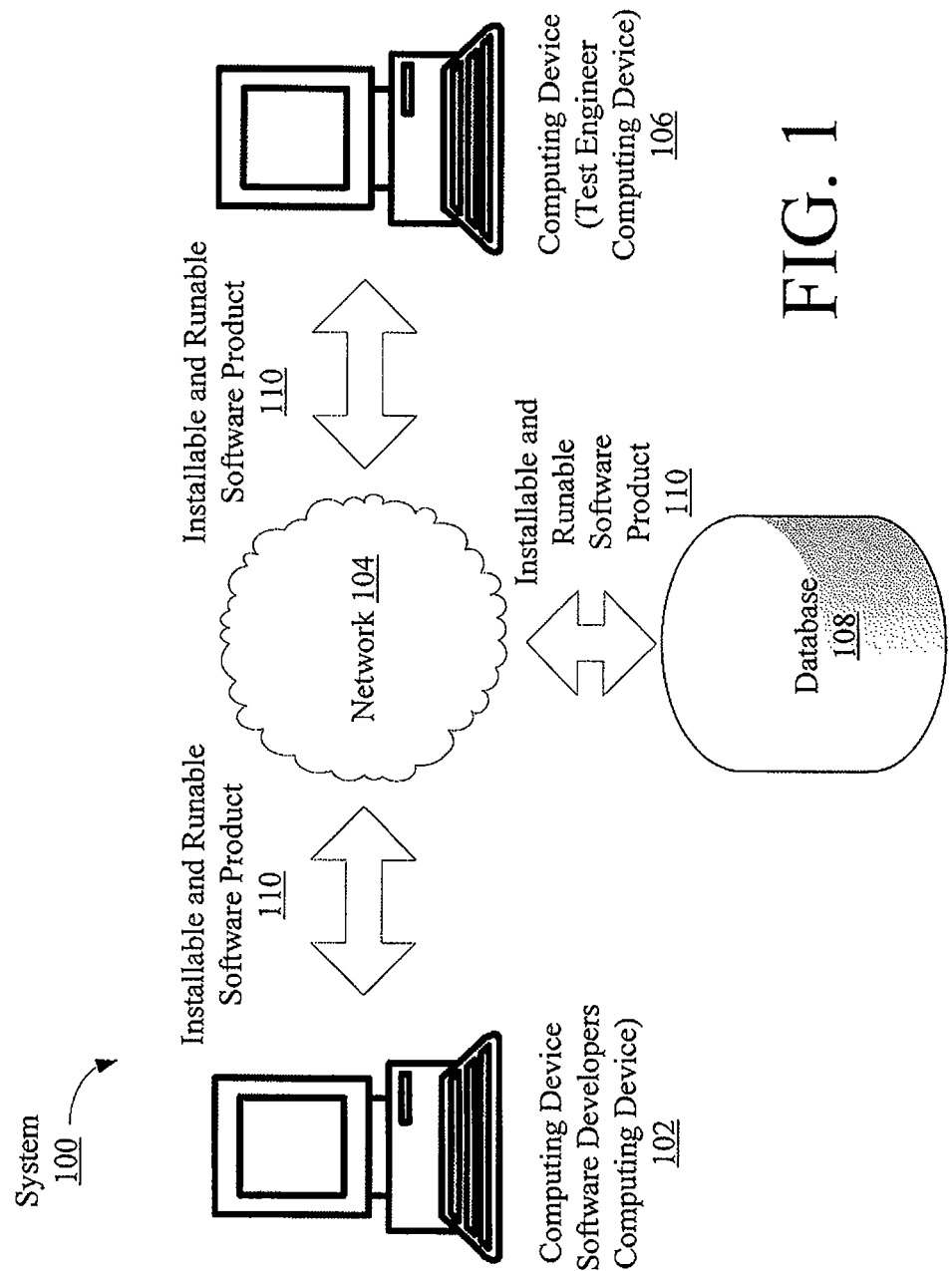
FIG. 1 is a schematic illustration of an exemplary system that is useful for understanding the present invention.

The present invention is described with reference to the attached figures, wherein like reference numbers are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention involve an implementation of UI flagging. The phrase "UI flagging" generally refers to a method for setting visual indicators on UI elements of a UI when code that generates the UI elements has changed from a previous iteration (or version) thereof. The code can be changed so that at least one of a visual characteristic, an auditory characteristic and a functional characteristic of a visual element is changed from a pervious version thereof. The visual characteristic includes, but is not limited to, a color scheme of a visual element, content of supporting text label(s) to be displayed with the visual element, a font size of the supporting text label, a font style of the supporting text label, and a pictorial representation to be displayed with the visual element. The auditory characteristic includes, but is not limited to, a sound output when certain events occur (e.g., when a visual element is displayed on a display screen and/or when a visual element is clicked by a user of a computing device). The functional characteristic includes, but is not limited to, an ability to cause certain event or acts to occur in response to certain user-software interactions (e.g., to cause a file to be transferred from a first storage device to a second storage device when a user clicks on a button). The UI elements include, but are not limited to, windows (or containers), buttons, check boxes, option buttons, sliders, list box, spinner, drop down list, menus, toolbar, ribbon, combo boxes (e.g., text boxes with attached menus or list boxes), icons, tree views (or outline views), grid views (or datagrids), tabs, scrollbars, and/or text boxes.

The visual indicators allow software test engineers and other persons to visually distinguish any new UI paths that need to be tested for defects. The visual indicators also allow software test engineers and other persons to visually distinguish UI elements of a product that have been changed from UI elements of the product that have not been changed. The visual indicators further allow software test engineers and other persons to visually distinguish UI elements that have been removed from the product.

Referring now to FIG. 1, there is provided a schematic illustration of an exemplary system 100 that is useful for understanding the present invention. As shown in FIG. 1, the system 100 comprises computing devices 102, 106, a network 104 and a database 108. Embodiments of the present invention are not limited to the architecture shown in FIG. 1. For example, the system 100 can include more or less components than those shown in FIG. 1.

Generally, computing devices 102, 106 may include virtually any computing device. In one embodiment, the computing devices 102, 106 include workstation computers, personal computers, multiprocessor systems, microprocessor-based or programmable consumer electronics, and/or the like. As such, the computing devices 102, 106 may range widely in terms of capabilities and features. For example, the computing devices 102, 106 may be configured to run desktop applications.

As shown in FIG. 1, the computing device 102 can be utilized by a software developer. As such, the computing device 102 has at least one software development application installed thereon. The phrase "software development application" refers to a software application operative to manage code (e.g., source code) for other software applications and compiles the code to thereby produce an installable and runable software application. The computing device 102 is communicatively coupled to the database 108 via the network 104. Accordingly, the computing device 102 is operative to transfer files to the database 110. The files can include, but are not limited to, files for an installable and runable software product 110. The tangible components of computing device 102 will be described below in relation to FIG. 2.

Network 104 is configured to couple one computing device 102, 104 with another computing device 102, 104. Network 104 may be enabled to employ any form of computer readable media for communicating information from one electronic device to another. Also, network 104 can include the Internet in addition to Local Area Networks (LANs), Wide Area Networks (WANs), direct connections, such as through a Universal Serial Bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include a twisted wire pair or coaxial cable, while communication links between networks may utilize analog telephone lines, full or fractional dedicated digital lines, Integrated Services Digital Networks (ISDNs), Digital Subscriber Lines (DSLs), wireless links including satellite links, or other communications links known to those having ordinary skill in the art. Furthermore, remote computers and other related electronic devices could be remotely connected to either LANs or WANs via a modem and temporary telephone link.

Computing device 106 can be utilized by a test engineer. As such, the computing device 106 has at least one application that is to be tested installed thereon. This application can include, but is not limited to, UI flagging code. UI flagging code will be described in detail below. Computing device 106 may request and/or receive data, applications or the like over the network 104. For example, computing device 106 can request and receive files for the installable and runable software product 110.

Figure 2:
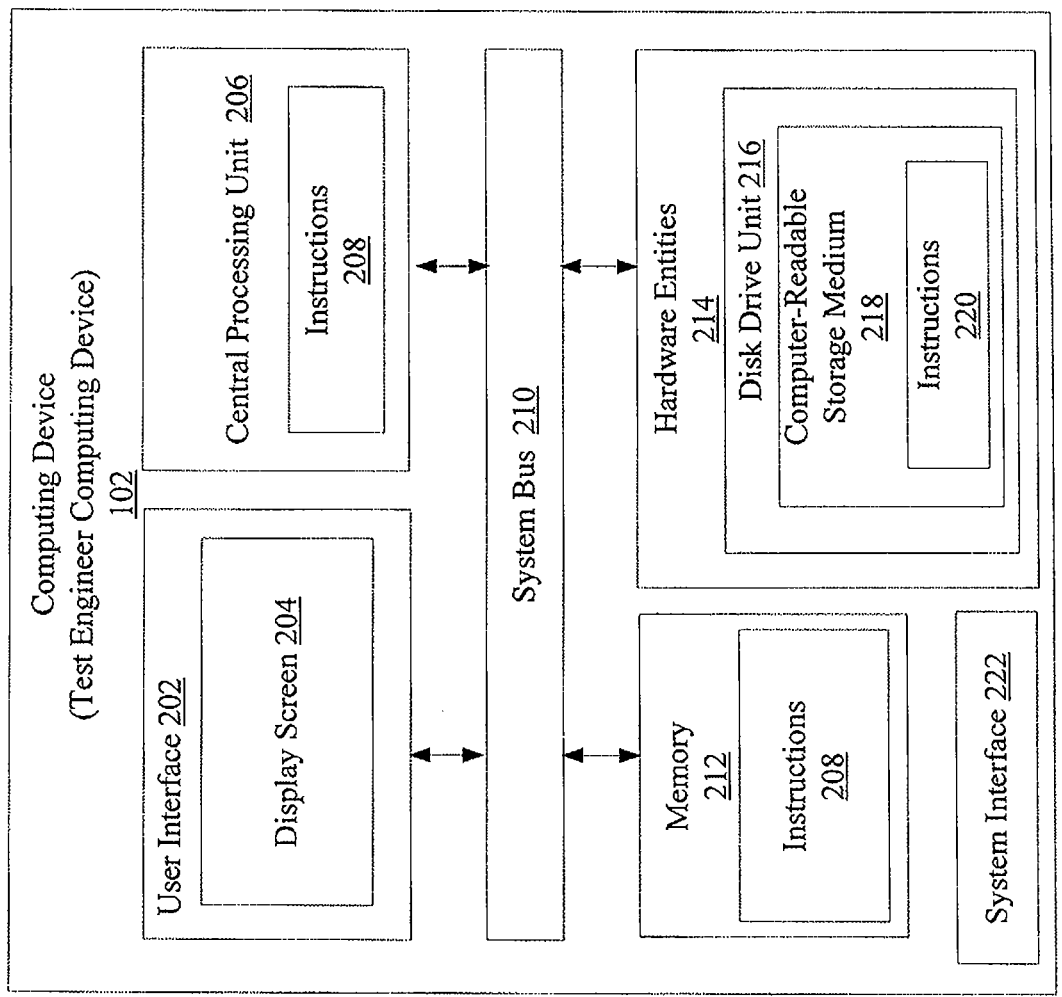
FIG. 2 is a detailed block diagram of a computing device shown in FIG. 1 that is useful for understanding the present invention.

Referring now to FIG. 2, there is provided a detailed block diagram of the computing device 102 that is useful for understanding the present invention. Computing device 106 is the same as or substantially similar to computing device 102. As such, the following discussion of computing device 102 is sufficient for understanding computing device 106 of FIG. 1. Notably, the computing device 102 may include more or less components than those shown in FIG. 2. However, the components shown are sufficient to disclose an illustrative embodiment implementing the present invention. The hardware architecture of FIG. 2 represents one embodiment of a representative computing device executing an application having UI flagging capabilities.

As shown in FIG. 2, computing device 102 includes a system interface 222, a user interface 202, a Central Processing Unit (CPU) 206, a system bus 210, a memory 212 connected to and accessible by other portions of computing device 106 through system bus 210, and hardware entities 214 connected to system bus 210. At least some of the hardware entities 214 perform actions involving access to and use of memory 212, which may be a random access memory (RAM), a disk driver, and/or a compact disc read only memory (CD-ROM).

User interface 202 is comprised of input devices, output devices, and software routines configured to allow a user to interact with and control software applications installed on the computing device 102. Such input and output devices include, but are not limited to, a display screen 204, a speaker (not shown), a keypad (not shown), a directional pad (not shown), a directional knob (not shown), and a microphone (not shown). As such, user interface 202 can facilitate a user-software interaction for launching software development applications and other types of applications installed on the computing device 102.

System interface 222 allows the computing device 102 to communicate directly or indirectly with the database 108 and/or other computing devices (e.g., the computing device 106 of FIG. 1). If the computing device 102 is communicating indirectly with the external device (e.g., the database 108 and/or the computing device 106 of FIG. 1), then the computing device 102 is sending and receiving communications through the common communications network (e.g., network 104 described above in relation to FIG. 1).

Hardware entities 214 may include microprocessors, application specific integrated circuits (ASICs), and other hardware. Hardware entities 214 may include a microprocessor programmed for facilitating the development of software products (e.g., the software product 110 shown in FIG. 1). In this regard, it should be understood that the microprocessor can access and run a software development application installed on the computing device 102. The software development application is operative to perform software development operations and UI flagging operations.

The software development operations can include, but are not limited to, operations for adding UI elements to UI code (e.g., source code) for a software product (e.g., software product 110 of FIG. 1), operations to change code that generates the UI elements of the software product, and operations to remove code that generates the UI elements of the software product. The code can include, but is not limited to, source code or other interpreted or compiled language code (e.g., markup language code). The source code can include, but is not limited to, the text of a program as it is written by a software developer and/or other application. A programming language is used to write source code text files that contain the function of a software program. The source code text files can be stored in a local memory device (e.g., memory 212 and disk drive unit 216) and/or a remote memory device (e.g., the database 108 of FIG. 1). The source code text files are then "compiled" and "built" into a non-text file that is run as a program on a computing device (e.g., the computing device 106 of FIG. 1). In such a scenario, the software product (e.g., software product 110 of FIG. 1) includes the non-text files. Exemplary software development operations will be described below in relation to FIGS. 3-5.

The UI flagging operations can include, but are not limited to, operations for selecting UI flagging indictor types (e.g., a border type of indicator, a textual type of indicator, a flash type of indicator, etc . . . ), operations for detecting a change in code (e.g., source code) that generates the UI elements of a UI, operations for selectively adding UI flagging code to the code (e.g., source code), operations for removing a UI flagging setting from a software development project, and/or operations for collecting data relating to UI flagging code useful for building a historical record of a software product. Exemplary UI flagging operations will be described below in relation to FIGS. 3-5.

As shown in FIG. 2, the hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 102. The memory 212 and the CPU 206 also can constitute machine-readable media.

While the computer-readable storage medium 218 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable storage medium" shall accordingly be taken to include, but not be limited to solid-state memories (such as a memory card or other package that houses one or more read-only (non-volatile) memories, random access memories, or other re-writable (volatile) memories), magneto-optical or optical medium (such as a disk or tape). Accordingly, the disclosure is considered to include any one or more of a computer-readable storage medium or a distribution medium, as listed herein and to include recognized equivalents and successor media, in which the software implementations herein are stored.

System interface 222 can include a network interface unit configured to facilitate communications with the Internet, or some other communications network. Accordingly, the network interface unit is constructed for use with various communication protocols including the IP protocol. Network interface unit can include, but is not limited to, a transceiver, a transceiving device, and a network interface card (NIC).

Figure 3:
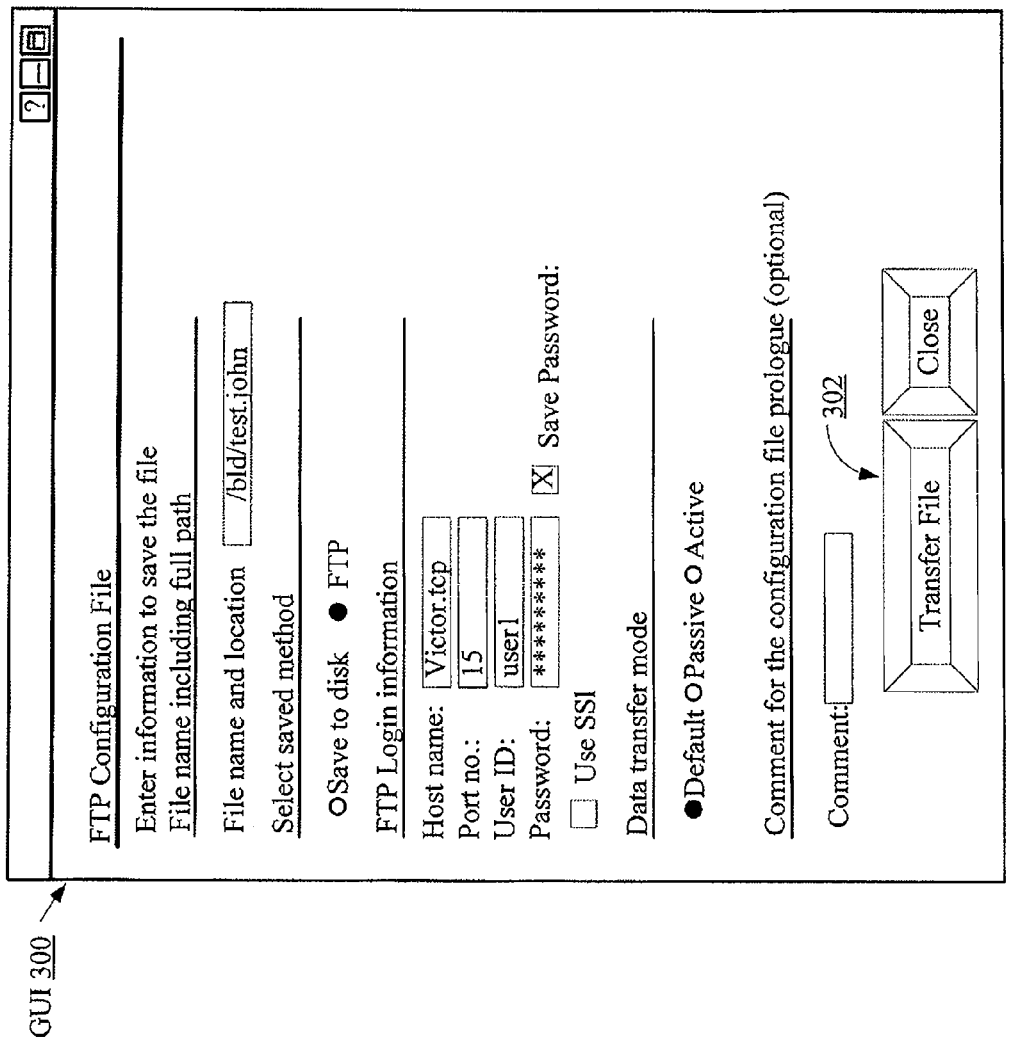
FIG. 3 is a schematic illustration of an exemplary Graphical User Interface (GUI) for a web based application that is useful for understanding the present invention.
Figure 4:
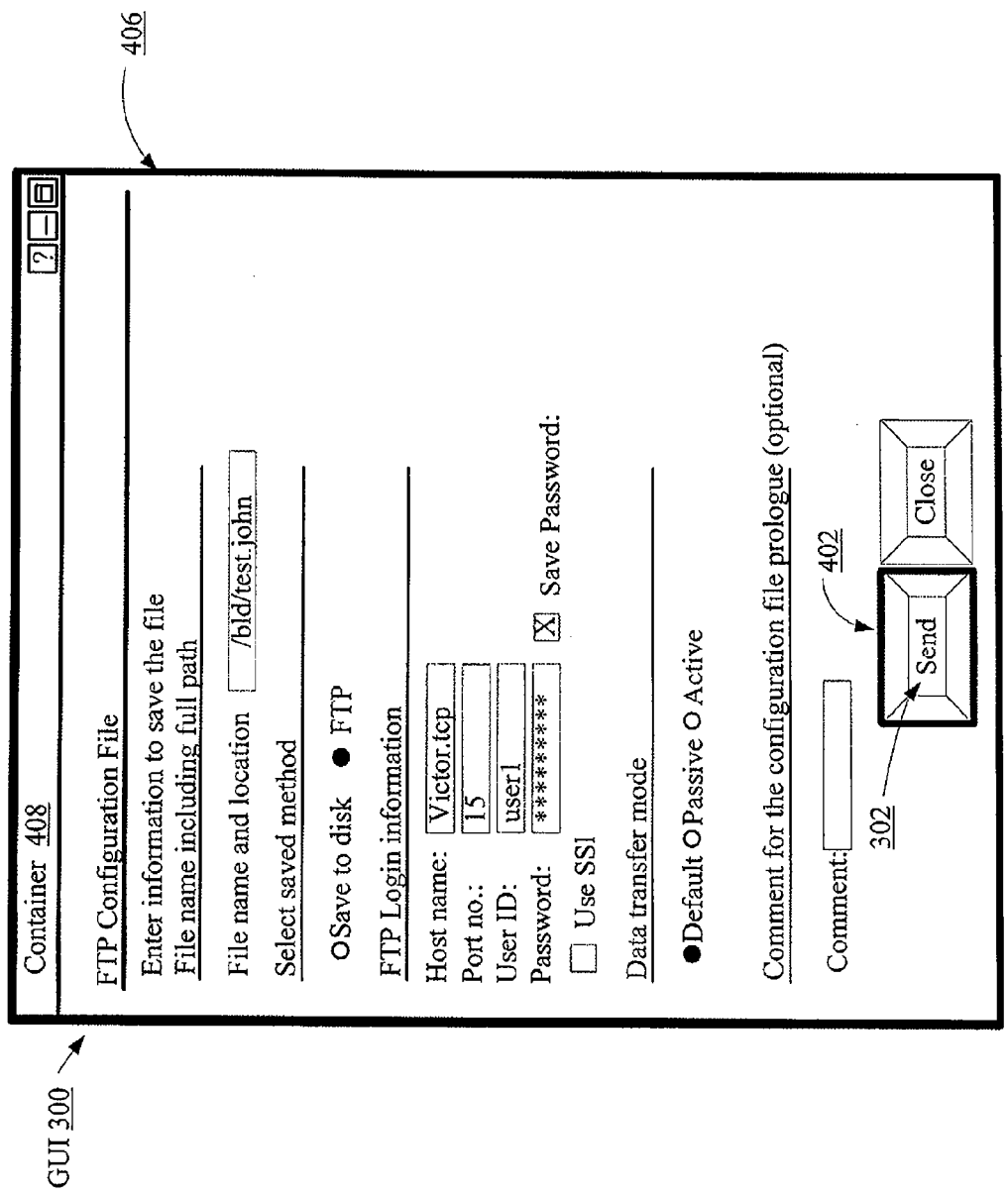
FIG. 4 is a schematic illustration of the GUI of FIG. 3 with visual indicators for a send button and its container that is useful for understanding the present invention.
Figure 5:
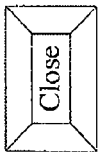
FIG. 5 is a schematic illustration of the GUI of FIG. 4 after the send button has been clicked that is useful for understanding the present invention.

Exemplary software development operations and UI flagging operations at least partially facilitated by a computing device (e.g., computing device 102 or 106 of FIG. 1) will now be described in relation to FIGS. 3-5. Prior to performing UI flagging operations, a user (e.g., a software developer) of the computing device (e.g., computing device 102 or 106 of FIG. 1) creates a GUI. For example, the user (e.g., the software developer) creates a GUI 300 for a web based application shown in FIG. 3. The GUI 300 facilitates user-software interactions to transfer files to a remote host via File Transfer Protocol (FTP). FTP is well known to those having ordinary skill in the art, and therefore will not be described herein. The exemplary GUI 300 is absent of UI flagging indicators. Thereafter, the user (e.g., the software developer) changes code that generates the button 302 of the GUI 300. For example, the user changes the code that generates the button 302 so that the text displayed thereon reads "Send" as opposed to "Transfer File". The code can include, but is not limited to, source code or other type of markup language code (e.g., Extensible Markup Language or XML). After changing the code that generates the button 302, the user (e.g., the software developer) runs UI flagging operations for automatically adding UI flagging code to changed code that generates the button 302. Embodiments of the present invention are not limited to the automatic insertion of UI flagging code in the code that generates the button 302. For example, all or a portion of the UI flagging code can alternatively or additionally be manually added to the base class source code for the UI element. As a result of running the UI flagging operations, one or more UI flagging visual indicators will be displayed in connection with the button 302 on the GUI 300. For example, a UI flagging visual indictor 402 is provided for the button 302 as shown in FIG. 4. UI flagging visual indictors (not shown) can further be provided for one or more UI objects (e.g., windows or containers 408) containing the button 302 and/or having a "trail" to the button 302. Next, the file including the modified code is compiled so as to form an installable and runable software product. This installable and runable software product is then tested for defects. During the defect testing, the same or different user (e.g., a test engineer) of the computer device is able to visually determine that the button 302 and all UI objects (e.g., the window or container 408) containing and/or having a "trail" to the button 302 need to be tested for defects. As each changed UI element of the GUI 300 is tested, the corresponding UI flagging visual indicator(s) is(are) removed therefrom. For example, if the user (e.g., the test engineer) clicks on the button 302, then the UI flagging visual indicators 402, 406 are removed from the GUI 300 as shown in FIG. 5. The removal of the UI flagging visual indicators 402, 406 is facilitated by the addition of a "checking" code to the UI flagging code that was added to base class source code for generating a UI element and/or that was added to the code for generating a UI object. Consequently, the user (e.g., the test engineer) is able to determine visually what UI elements have and have not been tested for defects. Embodiments of the present invention are not limited to the software development operations and UI flagging operations described above in relation to FIGS. 3-5.

According to embodiments of the present invention, the "checking" code reads as follows.

```
actionPerformed( ) {
    this. .borderColor = "black";
    this.flash = "false";
    myParent.turnOffParentUIFlagging( );
}
```

The above code is added to the base class code for the lowest level UI element (the one that was changed in the developer's source code). The actionPerformed( ) method is a standard practice in UI development that allows the code to catch events that the user executes on the UI. So in this case, the actionPerformed( ) method catches events (such as but not limited to clicks, text entry, etc.) and then turns off its flagging code. It then also calls the method turnOffParentUIFlagging( ) which tells its parent container to turn of its flagging code. Each container will have the following code added to it at build time.

```
turnOffParentUIFlagging ( ) {
    if ( allChildUIFlagsOff( )) {
        this. .borderColor = "black";
        this.flash = "false";
        myParent.turnOffParentUIFlagging( );
    }
}
```

This code first checks to see if all of its containers and elements that it contains have turned off flagging. This check is needed because if a container contains multiple elements with UI flagging then it will want to remain flagged until all of them are accessed by the user and turned off. If all contained containers and elements have UI flagging turned off then this container will turn off its own flagging and tell its parent container to do the same. This is repeated until the top-level container in the chain turns off its UI flagging. Embodiments of the present invention are not limited in this regard.

Notably, the system 100 of FIG. 1 implements a method 600 for developing and testing software. The following FIGS. 6A-6B and accompanying text illustrate such a method 600 for developing and testing software. It should be appreciated, however, that the method 600 disclosed herein is provided for purposes of illustration only and that embodiments of the present invention are not limited solely to the method shown.

Figure 6A:
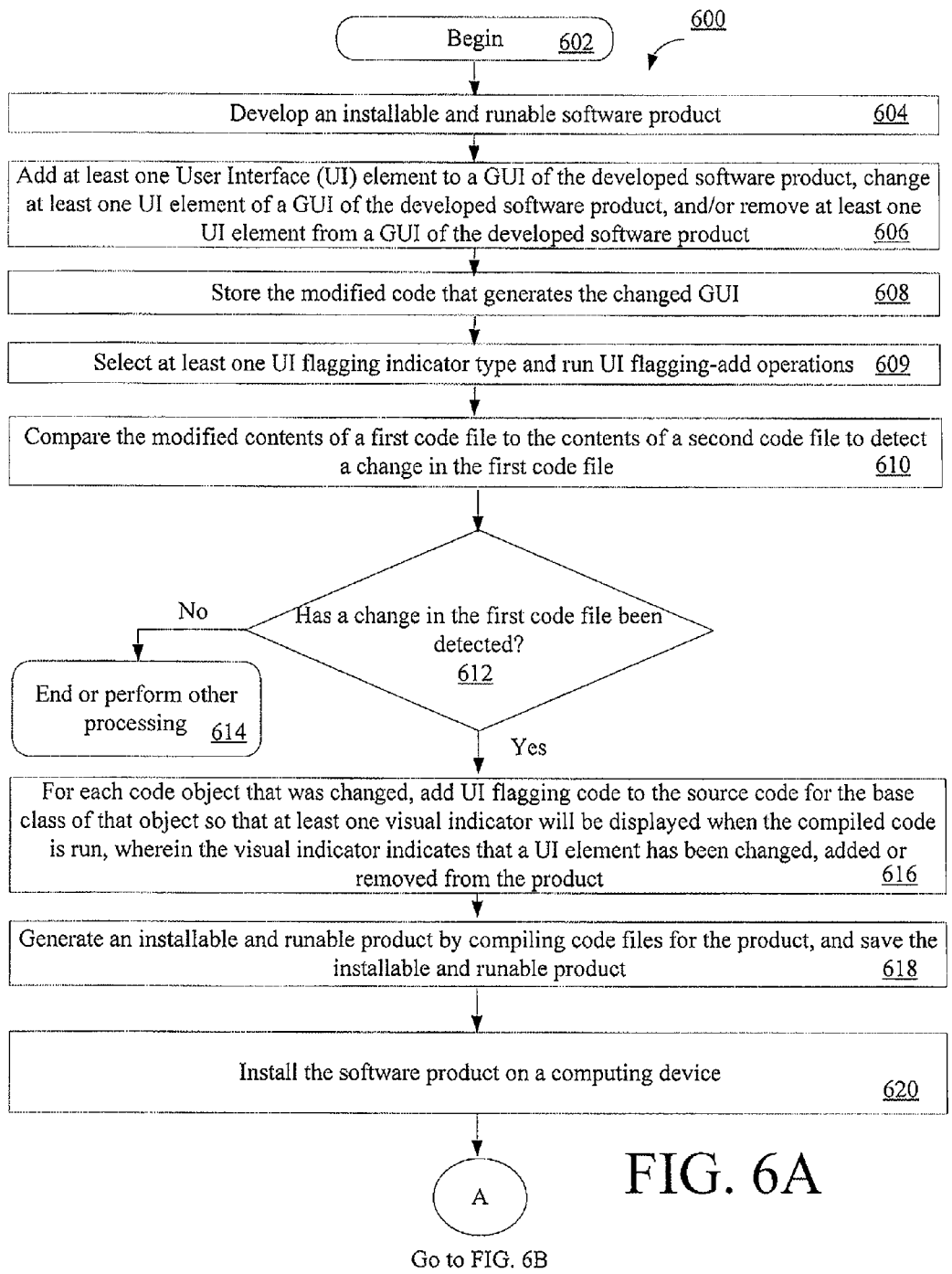
FIGS. 6A-6B collectively provide a flow diagram of an exemplary method for developing and testing software that is useful for understanding the present invention.
Figure 6B:
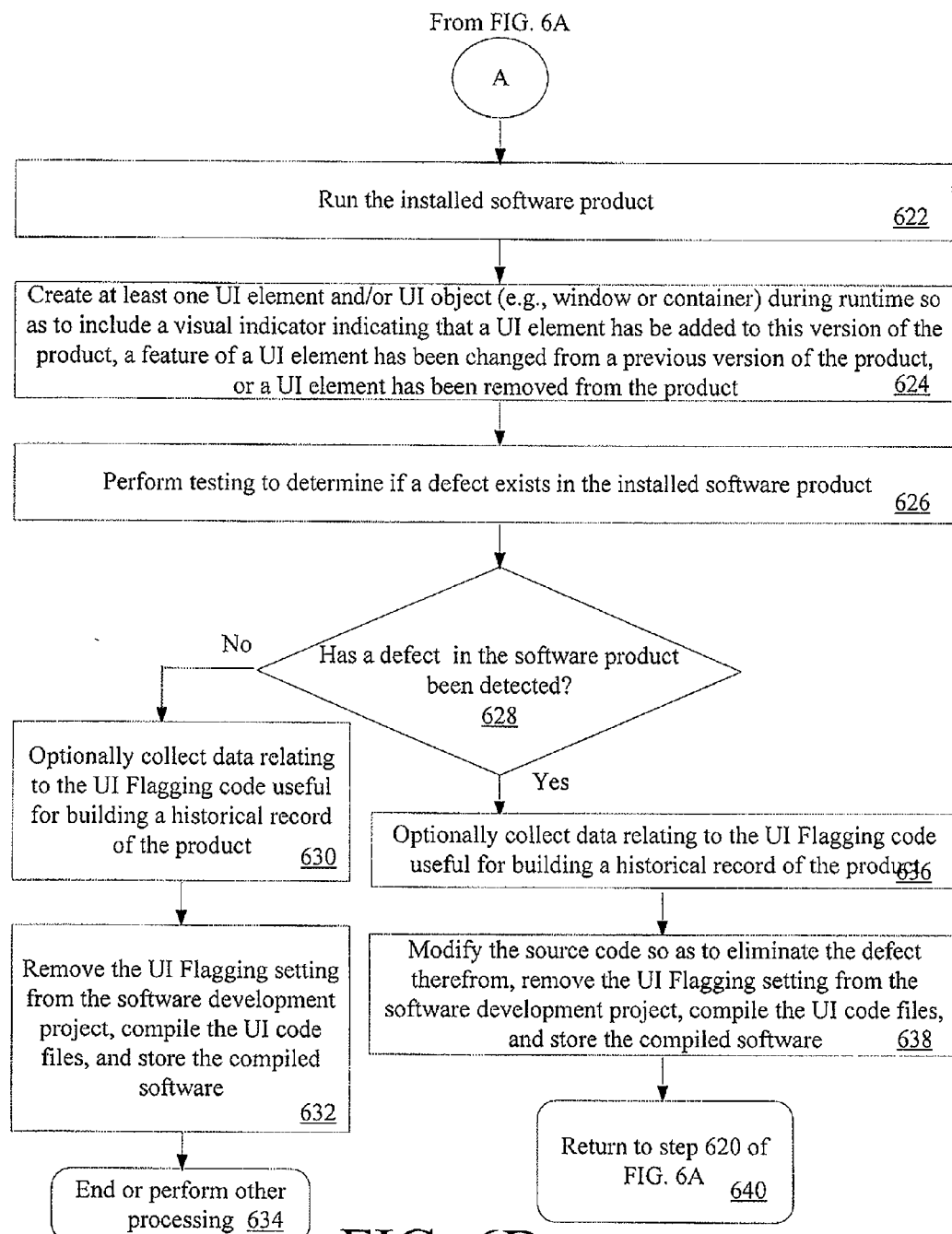

Referring now to FIGS. 6A-6B, there is provided a flow diagram of an exemplary method 600 for developing and testing software that is useful for understanding the present invention. As shown in FIG. 6A, the method 600 begins at step 602 and continues to step 604. In step 604, an installable and runable software product is developed. Thereafter, step 606 is performed where at least one UI element is added to a GUI of the software product, at least one UI element of the software product is changed, and/or at least one GUI element is removed from the software product. Step 606 can generally involve accessing and running an application (e.g., a software development application) that is operative to facilitate user-software interactions for modifying code (e.g., source code or other markup language code) that generates the UI element of the software product.

Figure 8:
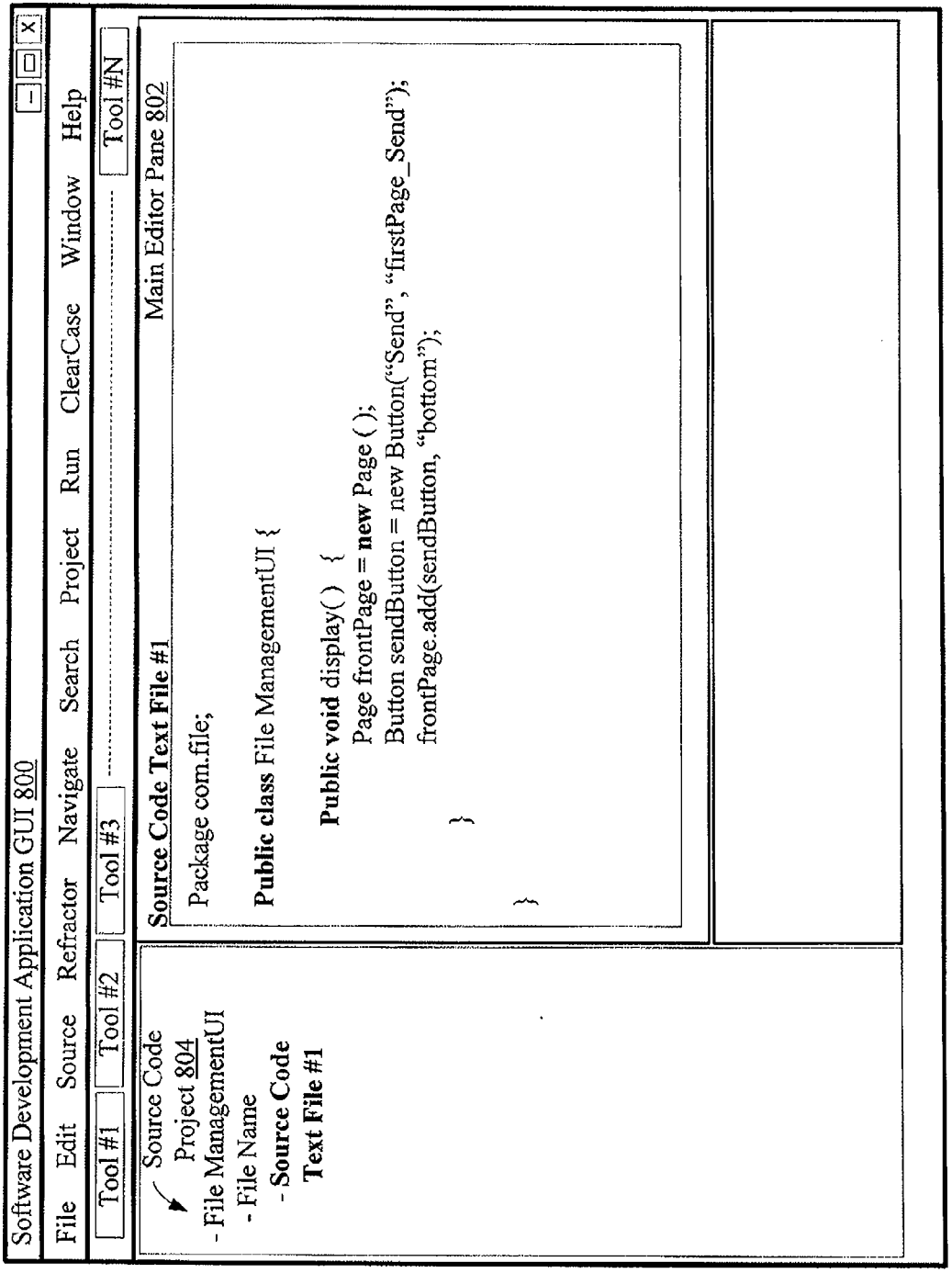
FIG. 8 is a schematic illustration of a GUI for development software that is useful for understanding the present invention.

A schematic illustration of an exemplary software development application GUI 800 is shown in FIG. 8. The GUI 800 of FIG. 8 includes a source code project portion identifying a source code project (or a software development project) 804. The GUI 800 also includes a main editor pane 802 in which a source code file is opened. A user (e.g., a software developer) of a computing device (e.g., the computing device 102 of FIG. 1) can edit the source code displayed in the main editor pane 802 so as to add source code for at least one new GUI element, change source code for the "Send" button and/or remove source code for the "Send" button therefrom. Embodiments of the present invention is not limited in this regard.

Referring again to FIG. 6A, the next step 608 involves storing the code (e.g., source code or other markup language code) for the modified GUI in a local memory device (e.g., memory 212 of FIG. 2 and/or computer-readable storage medium 218 of FIG. 2) of a computing device (e.g., computing device 102 of FIG. 1) and/or a remote memory device (e.g., database 108 of FIG. 1). After completing step 608, the method 600 continues with step 609.

In step 609, at least one UI flagging indicator type is selected using one of various methods. For example, the UI flagging indicator type is selected by using a "right mouse click" method to open a dialog box (e.g., the dialog box 1000 shown in FIG. 10) from a menu (e.g., the drop down menu 902 shown in FIG. 9), sub-menu (e.g., the sub-menu 912 shown in FIG. 9) and/or an icon (not shown) of a GUI (e.g., GUI 800 of FIGS. 8 and 9). The dialog box (e.g., the dialog box 1000 shown in FIG. 10) can be accessed by moving a cursor (not shown) on top of a "Set Indicator" option (e.g., option 910 shown in FIG. 9) of a sub-menu (e.g., the sub-menu 912 shown in FIG. 9) and clicking the mouse. The dialog box (e.g., the dialog box 1000) can include various options that can be selected for setting the type(s) of UI flagging indicators to be utilized by the software. Embodiments of the present invention are not limited in this regard. The UI flagging indicator type can be selected in accordance with any suitable manner. It should be noted that the UI flagging indicator type can be set per-change or globally for a particular software project. As such, other embodiments of the present invention perform step 609 prior to step 604.

Also in step 609, UI flagging-add operations are accessed and run. By running the UI flagging-add operations, the software development application will examine the source code for UI changes when a software application project is built. Also, the software development application will dynamically add (in system memory) UI flagging code in an application when the build is executed. In this way, the UI flagging code is added to the built software application, but it is not present in the project source code for removal therefrom at a latter time. The UI flagging-add operations can be accessed via a menu (e.g., the drop down menu 902 shown in FIG. 9), a sub-menu (e.g., the sub-menu 912 shown in FIG. 9) and/or an icon (not shown). For example, the UI flagging-add operations can be run by clicking a mouse on an option (e.g., the "Add . . . " option 906 shown in FIG. 9) of the menu or sub-menu. When the option (e.g., the "Add . . . " option 906 shown in FIG. 9) is clicked, UI flagging is turned "on" for the particular software project. An exemplary method for accessing and running UI flagging-add operations will be described in detail below in relation to FIG. 7.

Referring again to FIG. 6A, the method 600 continues with step 610 where a comparison is made to detect a change in the modified code (e.g., source code or other markup language code). This comparison generally involves comparing the modified contents of a first code file to contents of a second code file (i.e., a previous version of the first code file). Upon completing this comparison of code file contents, a decision step 612 is performed. If a change in the first code file has not been detected [612:NO], then the method 600 continues with step 614 where the method 600 ends or other processing is performed. If a change in the first code file has been detected [612:YES], then the method 600 continues with step 616. Step 616 generally involves adding UI flagging code to the code (e.g., source code or other markup language code) for the base class of each code object that was changed so that at least one visual indicator (e.g., the visual indicators 404 and 406 of FIG. 4) will be displayed when the compiled code is run. The visual indicator indicates that at least one UI element has been changed, added to the product or removed from the product. Step 616 can also involve optionally collecting data relating to the UI flagging code useful for building a historical record of the product.

After completing step 616, the method 600 continues with step 618. In step 618, an installable and runable product is generated by compiling code files (e.g., source code text files) for the product. Step 618 also involves saving the installable and runable product in a local memory device (e.g., memory 212 and/or disk drive unit 216 of FIG. 2) of the computing device (e.g., the computing device 102 of FIG. 1) and/or a remote memory device (e.g., the database 108 of FIG. 1). In the next step 620, the software product is installed on a computing device (e.g., the computing device 102 or 106 of FIG. 1). Subsequently, step 622 of FIG. 6B is performed where in the installed product is run.

In step 624 of FIG. 6B, at least one UI element and/or UI object is created during runtime so as to include at least one visual indicator. The visual indicator indicates that a UI element has been added to the product, a feature of a UI element has been changed, and/or a UI element has been removed from the product. Thereafter, testing is performed to determine if a defect exists in the installed software product. If a defect in the software product has not been detected [628: NO], the steps 630-634 are performed. Step 630 involves optionally collecting data relating to the UI flagging code useful for building a historical record of the product. Step 632 involves removing the UI flagging setting from the software development project. By removing the UI flagging setting from the software development project, the software development application will not examine the source code for UI changes. Also, the software development application will not add any UI flagging code in an application when a build is executed. The UI flagging setting can be removed from the software development project by accessing a running UI flagging-remove operations. The UI flagging-remove operations can be accessed via a menu (e.g., the drop down menu 902 shown in FIG. 9) or a sub-menu (e.g., the sub-menu 912 shown in FIG. 9) of an application (e.g., a development software application). The UI flagging-remove operations can be run by clicking a mouse on an option of the menu or sub-menu thereof (e.g., the "Remove . . . " option 908 shown in FIG. 9). An exemplary method for accessing and running UI flagging-remove operations will be described in detail below in relation to FIG. 7. Step 632 also involves compiling the UI code files (e.g., source code text files) and storing the compiled software (i.e., the final finished software product) in at least one local and/or remote memory device. In step 634, the method 600 ends or other processing is performed.

If a defect in the software product has been detected [628: YES], then steps 636-640 are performed. Step 636 generally involves optionally collecting data relating to the UI flagging code useful for building a historical record of the product. Step 638 involves modifying the code (e.g., source code or other markup language code) so as to eliminate the defect therefrom. Step 638 also involves removing the UI flagging setting from the software development project, compiling the UI code files and storing the compiled software (i.e., the final finished software product) in a local and/or remote memory device. The UI flagging setting can be removed from the software development project by accessing and running UI flagging-remove operations. By removing the UI flagging setting from the software development project, the software development application will not examine the source code for UI changes. Also, the software development application will not add any UI flagging code in an application when a build is executed. The UI flagging-remove operations can be run by clicking a mouse on an icon (not shown) and/or an option of the menu or sub-menu thereof (e.g., the "Remove . . . " option 908 shown in FIG. 9). An exemplary method for accessing and running UI flagging-remove operations will be described in detail below in relation to FIG. 7. In step 640, the method 600 returns to step 620 of FIG. 6A.

Figure 7:
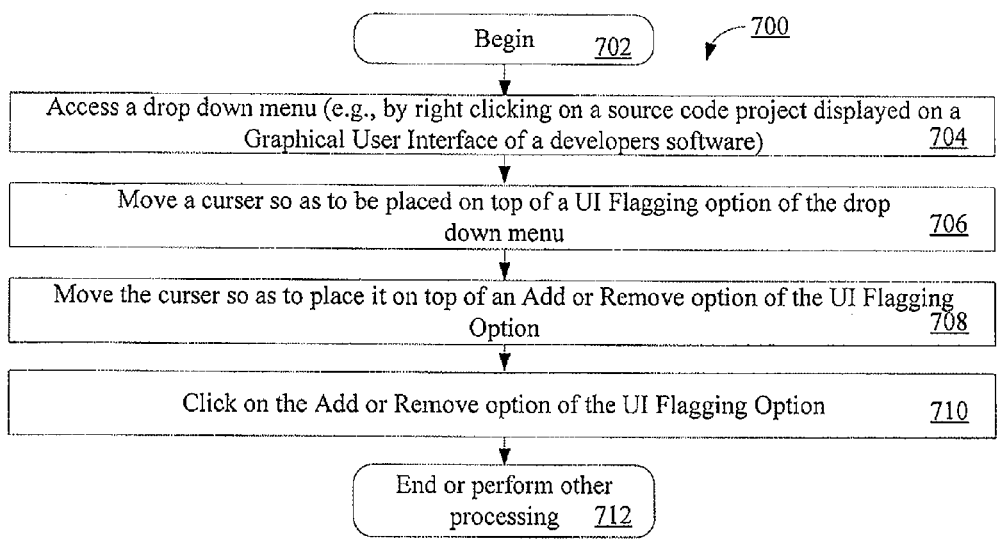
FIG. 7 is a flow diagram of an exemplary method for accessing and running UI flagging-add operations and/or UI flagging-remove operations that is useful for understanding the present invention.

Referring now to FIG. 7, there is provided a flow diagram of an exemplary method 700 for accessing and running UI flagging-add operations and/or UI flagging-remove operations that is useful for understanding the present invention. Method 700 begins at step 702 and continues with step 704. In step 704, a drop down menu (e.g., the drop down menu 902 of FIG. 9) is accessed. According to an embodiment of the present invention, the drop down menu (e.g., the drop down menu 902 of FIG. 9) is accessed by moving a mouse cursor (not shown) on top of a source code project identifier (e.g., the source code project identifier 804 of FIGS. 8 and 9) and clicking the mouse thereon. In effect, the drop down menu (e.g., the drop down menu 902 of FIG. 9) appears on the display screen (e.g., the display screen 204 of FIG. 2) of the computing device (e.g., the computing device 102 or 106 of FIG. 1). Embodiments of the present invention are not limited in this regard.

Figure 9:
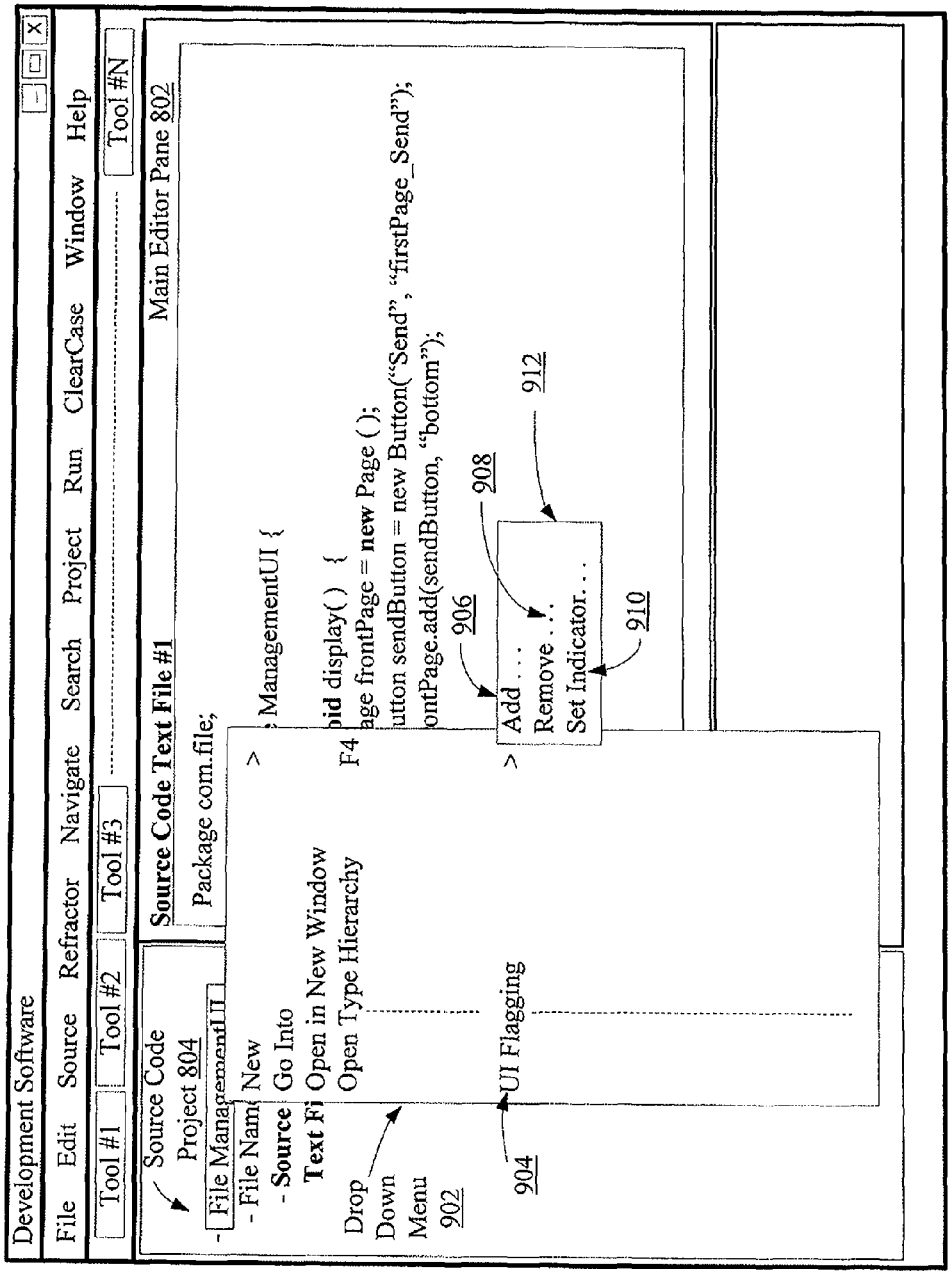
FIG. 9 is a schematic illustration of a GUI for development software that is useful for understanding the present invention.
Figure 10:
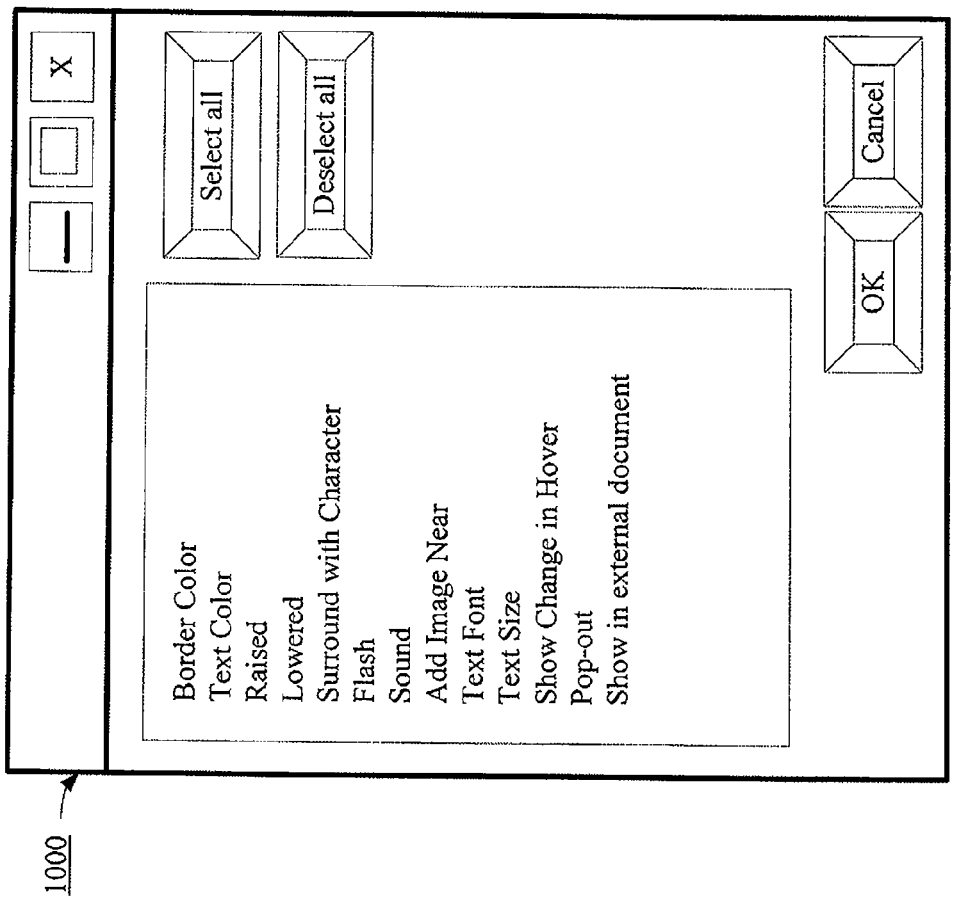
FIG. 10 is schematic illustration of a dialog box that is useful for understanding the present invention.

In a next step 706, the cursor (not shown) is moved so as to be placed on top of a "UI Flagging" option (e.g., UI Flagging option 904 of FIG. 9) of the drop down menu (e.g., the drop down menu 902 of FIG. 9). As a result of moving the mouse cursor (not shown) on top of the "UI Flagging" option, a sub-menu (e.g., the sub-menu 912 shown in FIG. 9) appears on the display screen (e.g., the display screen 204 of FIG. 2). Thereafter, step 708 is performed where the cursor (not shown) is moved on top of an "Add . . . " option (e.g., option 906 shown in FIG. 9) or a "Remove . . . " option (e.g., option 908 shown in FIG. 9) of the sub-menu (e.g., the sub-menu 912 shown in FIG. 9). In step 710, the mouse is clicked. As a result of clicking the mouse, UI flagging is "enabled" for the particular project. In effect, the UI flagging-add operations will be performed for adding UI flagging code to code (e.g., source code or other markup language code) that generates an added UI element, generates a changed UI element, or generated a removed UI element. Alternatively, UI flagging is "disabled" for the project and no UI flagging indicators will be added to the code (e.g., source code or other markup language code). Also, UI flagging-remove operations can be performed for removing a UI flagging setting from a software development project. Thereafter, step 712 is performed where the method 700 ends or other processing is performed.

Figure 11:
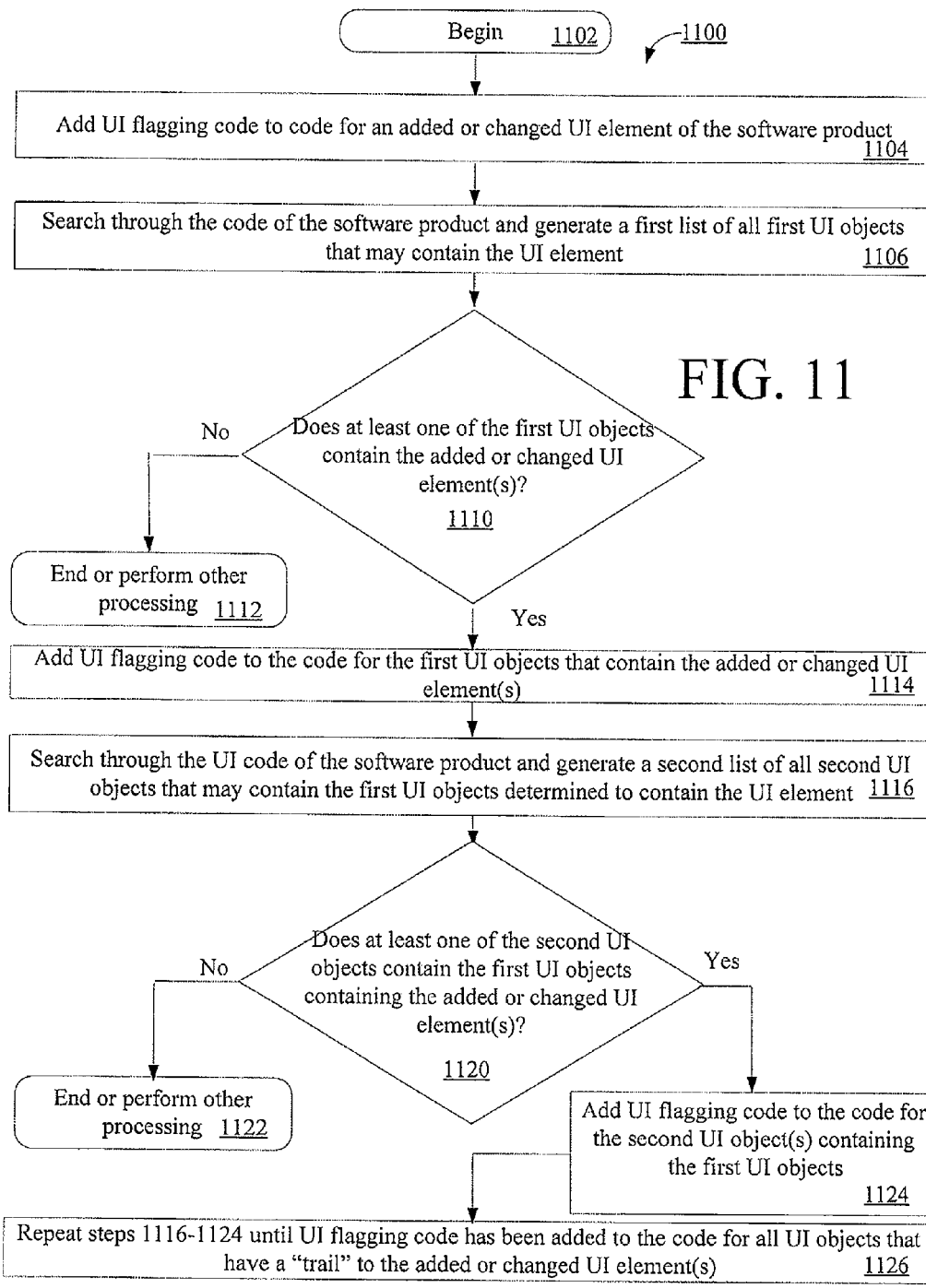
FIG. 11 is a flow diagram of a method for adding UI flagging code to UI code that is useful for understanding the present invention.

Referring now to FIG. 11, there is provided a flow diagram of a method 1100 for adding UI flagging code to code (e.g., source code or other markup language code) that is useful for understanding the present invention. As shown in FIG. 11, the method 1100 begins at step 1102 and continues with step 1104. In step 1104, UI flagging code is added to code (e.g., source code or other markup language code) that generates an added UI element and/or generates a changed UI element. In a next step 1106, a search through the code (e.g., source code or other markup language code) is performed. Step 1106 also involves generating a list of all first UI objects (e.g., windows or containers) that may contain the UI element.

After the list is generated, a decision step 1110 is performed. If at least one of the first UI objects (e.g., windows or containers) does not contain the added or changed UI element(s) [1110:NO], then step 1112 is performed. In step 1112, the method 1100 ends or other processing is performed. If at least one of the first UI objects contains the added or changed UI element(s) [1110:YES], then step 1114 is performed. In step 1114, UI flagging code is added to the code (e.g., windows or containers) for the first UI object(s) determined to contain the added or changed UI element(s).

In a next step 1116, another search through the code (e.g., windows or containers) is performed. Also, a second list is generated identifying all second UI objects (e.g., windows or containers) that may contain the first UI object(s) determined to contain the added or changed UI element(s). If at least one of the second UI objects does not contain one or more of the first UI objects containing the added or changed UI element(s) [1120:NO], then step 1122 is performed. In step 1122, the method 1100 ends or other processing is performed. If at least one of the second UI objects does contain one or more of the first UI objects containing the added or changed UI element(s) [1120:YES], then steps 1124 and 1126 are performed. In step 1124, UI flagging code is added to code (e.g., source code or other markup language code) for the second UI object(s). In step 1126, steps 1116-1124 are repeated until UI flagging code has been added to the code (e.g., source code or other markup language code) for all UI objects that have a "trail" to the added or changed UI element(s).

Figure 12:
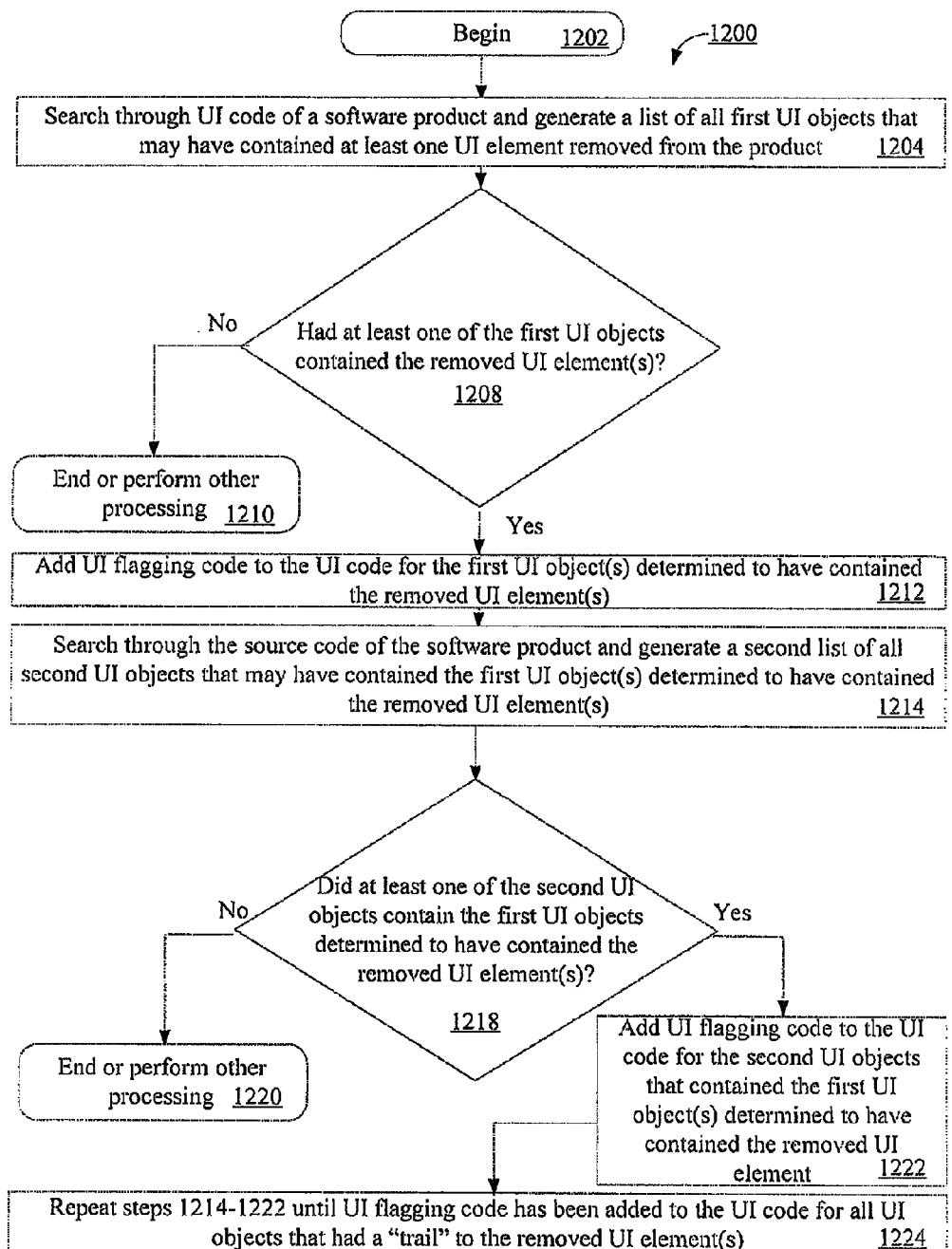
FIG. 12 is a flow diagram of a method for adding UI flagging code to UI code that is useful for understanding the present invention.

Referring now to FIG. 12, there is provided a flow diagram of a method 1200 for adding UI flagging code to code (e.g., source code or other markup language code) that is useful for understanding the present invention. As shown in FIG. 12, the method 1200 begins at step 1202 and continues with step 1204. In step 1204, a search through code (e.g., source code or other markup language code) of a software product is performed. Step 1204 also involves generating a first list of all first UI objects (e.g., windows or containers) that may have contained at least one UI element removed from a software product. If at least one of the first UI objects (e.g., windows or containers) had not contained the UI element(s) removed from a software product [1208:NO], then step 1210 is performed. In step 1210, the method 1200 ends or other processing is performed. If at least one of the first UI objects had contained the UI element(s) removed from a software product [1208:YES], then step 1212 is performed. In step 1212, UI flagging code is added to the code (e.g., source code or other markup language code) for the first object(s) determined to have contained the removed UI element(s).

Thereafter, step 1214 is performed where another search through the code (e.g., source code or other markup language code) is performed. Also in step 1214, a second list is generated identifying all second UI objects that may have contained the first UI objects that had contained the removed UI element(s). If at least one of the second UI objects did not contain the first UI object(s) determined to have contained the removed UI element(s) [1218:NO], then step 1220 is performed where the method 1200 ends or other processing is performed. If at least one of the second UI objects did contain the first UI object(s) determined to have contained the removed UI element(s) [1218:YES], then step 1222 is performed. In step 1222, UI flagging code is added to the code (e.g., source code or other markup language code) for the second UI object(s) that contained the first UI object(s) having contained the removed UI element(s). Subsequently, step 1224 is performed where steps 1214-1222 are repeated until UI flagging code has been added to the code (e.g., source code or other markup language code) for all UI objects that had a "trail" to the removed UI element(s).

The following Examples 1 and 2 are provided in order to further illustrate the methods 600, 1100 and 1200. The scope of the invention, however, is not to be considered limited in any way thereby.

EXAMPLE 1

Lets assume that there is a button on a first page of a UI application called "Send". The original lines of source code for this button read as follows.

```
Button sendButton = new Button("Send", "firstPage_Send");
frontPage.add(sendButton, "bottom");
```

The first line of source code creates a button instance called sendButton that is to be displayed with the word "Send" thereon. Also, the firstPage_Send word is a unique identifier that distinguishes this "Send" button from all other UI elements of the UI application. The second line of source code adds the "Send" button to the first page of the UI application so that it will be displayed on the bottom thereof.

At a later date, a user (e.g., a software developer) of a computing device (e.g., the computing device 102 of FIG. 1) changes the text displayed on the button. The modified lines of source code for the button read as follows.

```
Button sendButton = new Button("Go", "firstPage_Send");
frontPage.add(sendButton, "bottom");
```

As can be seen from the second line of source code, the text displayed on the button is changed from "Send" to "Go". Thereafter, the modified source code is saved in a source code text file.

Using simple file comparison, changes in the source code is detected from the button UI element. Next, UI flagging code is added to the base Button class constructor(s). The UI flagging code can be operative to cause the button to appear with a red border, to cause the text of the button to appear in a particular font (e.g., Courier New), to cause the text of the button to flash, to cause the text of the button to appear in a particular color, and/or to cause a sound to be output when the button is clicked. Accordingly, the UI flagging code can read as follows.

```
If (id == "firstPage__Send"") {
    this.borderColor = "Red";
}
If (id == "firstPage__Send"") {
    this.font = "Courier New";
}
If (id == "firstPage__Send"") {
    this.flash = "true";
}
```

When the button element is created at runtime, this UI flagging code causes the button to appear with a red border, causes the text of the button to appear in Courier New font, and causes the text of the button to flash.

Also, a search of the source code is performed to identify all UI objects (e.g., windows or containers) that may contain the changed button element. A list is generated identifying the UI objects that may contain the changed button element. The items of the list are checked to determine if they contain the changed button element. If a UI object contains the changed button element, then UI flagging code is added to the source code for that UI object. This process is repeated until UI flagging code is added to the source code for all UI objects having a "trail" to the changed button element.

After the application has been fully tested and all defects thereof have been eliminated, the UI flagging setting is removed from the software development project. The software development project is built. The resulting compiled software (i.e., the final finished software product) is stored. Also, information is collected that is useful for building a record of change indicators for each build of the application. In effect, a particular build of a product can be run at a later date with the UI flagging indicators displayed in GUIs thereof.

EXAMPLE 2

Lets assume that that a software developer changes a source code text file by adding a new UI element thereto. The source code for the added UI element reads as follows.

```
Button closeButton = new Button("Close", "firstPage__Close");
frontPage.add(closeButton, "bottom");
```

The first line of source code creates a button instance called closeButton that is to be displayed with the word "Close" thereon. Also, the firstPage_Close word is a unique identifier that distinguishes this "Close" button from all other UI elements of the UI application. The second line of source code adds the "Close" button to the first page of the UI application so that it will be displayed on the bottom thereof. FilePage is an example of a container object because it has reference to, or "contains", the closeButton object.

Using simple file comparison, changes in the source code is detected from the button UI element. Next, UI flagging code is added to the base Button class constructor(s). The UI flagging code can be operative to cause the button to appear with a red border, to cause the text of the button to appear in a particular font (e.g., Courier New), to cause the text of the button to flash, to cause the text of the button to appear in a particular color, and/or to cause a sound to be output when the button is clicked. Accordingly, the UI flagging code reads as follows.

```
If (id == "firstPage__Close"") {
    this.borderColor = "Red";
}
If (id == "firstPage__Close"") {
    this.font = "Courier New";
}
If (id == "firstPage__Close"") {
    this.flash = "true";
}
```

When the button element is created at runtime, this UI flagging code causes the button to appear with a red border, causes the text of the button to appear in Courier New font, and causes the text of the button to flash.

Also, a search of the source code is performed to identify all UI objects that may have contained the removed button element. A list is generated identifying the UI objects that may have contained the removed button element. The items of the list are checked to determine if they had contained the removed button element. If a UI object had contained the changed button element, then UI flagging code is added to the source code for that UI object. This process is repeated until UI flagging code is added to the source code for all UI objects that had a "trail" to the removed button element.

After the application has been fully tested and all defects thereof have been eliminated, the UI flagging setting is removed from the software development project. The software development project is built. The resulting compiled software (i.e., the final finished software product) is stored. Also, information is collected that is useful for building a record of change indicators for each build of the application. In effect, a particular build of a product can be run at a later date with the UI flagging indicators displayed in GUIs thereof.

Although Examples 1 and 2 describe methods for UI flagging that is applicable when source code is used to create UI elements and UI containers including the UI elements. Embodiments of the present invention are not limited in this regard. For example, the UI flagging methods of the present invention can also be employed when XML is used to described UI elements and their relationship to UI containers. The UI flagging methods of the present invention can also be employed when a visual designer (that uses underlying source code or XML) is utilized to create UI containers and add UI elements thereto.

Figure 13:
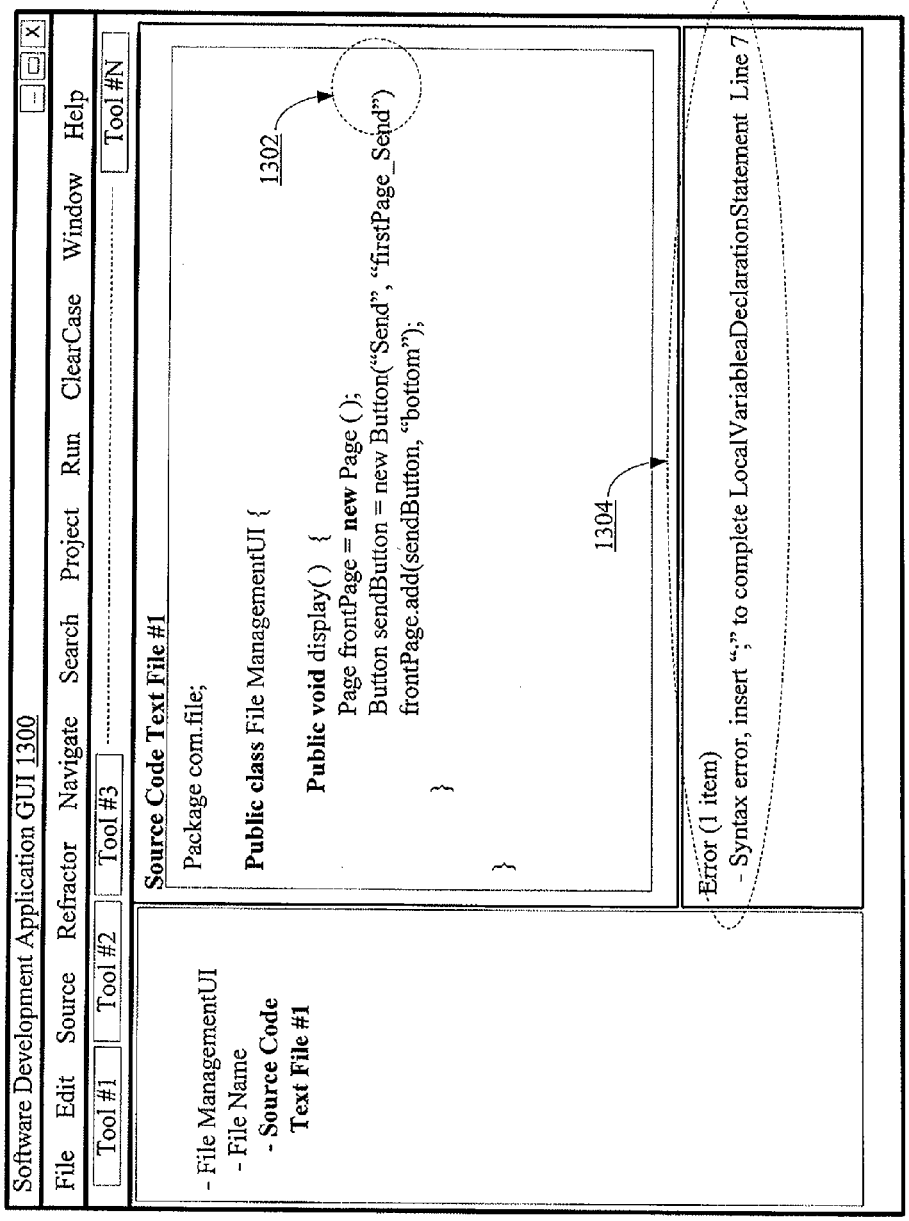
FIG. 13 is a schematic illustration of a GUI with error indicators that is useful for understanding the present invention.

Referring now to FIG. 13, there is provided a schematic illustration of a GUI 1300 that is useful for understanding an error indication feature of software development applications. As shown in FIG. 13, the GUI 1300 can be a GUI for a software development application. The GUI 1300 can be operative to display error indicators 1304 to a user (e.g., a software developer) of a computing device (e.g., the computing device 102 or 106 of FIG. 1) displaying the GUI 1300. As shown in FIG. 13, the error indicator 1304 indicates that compilation of the source code will fail because a semicolon at location 1302 of the source code has been omitted, and therefore should be inserted thereat.

Figure 14:
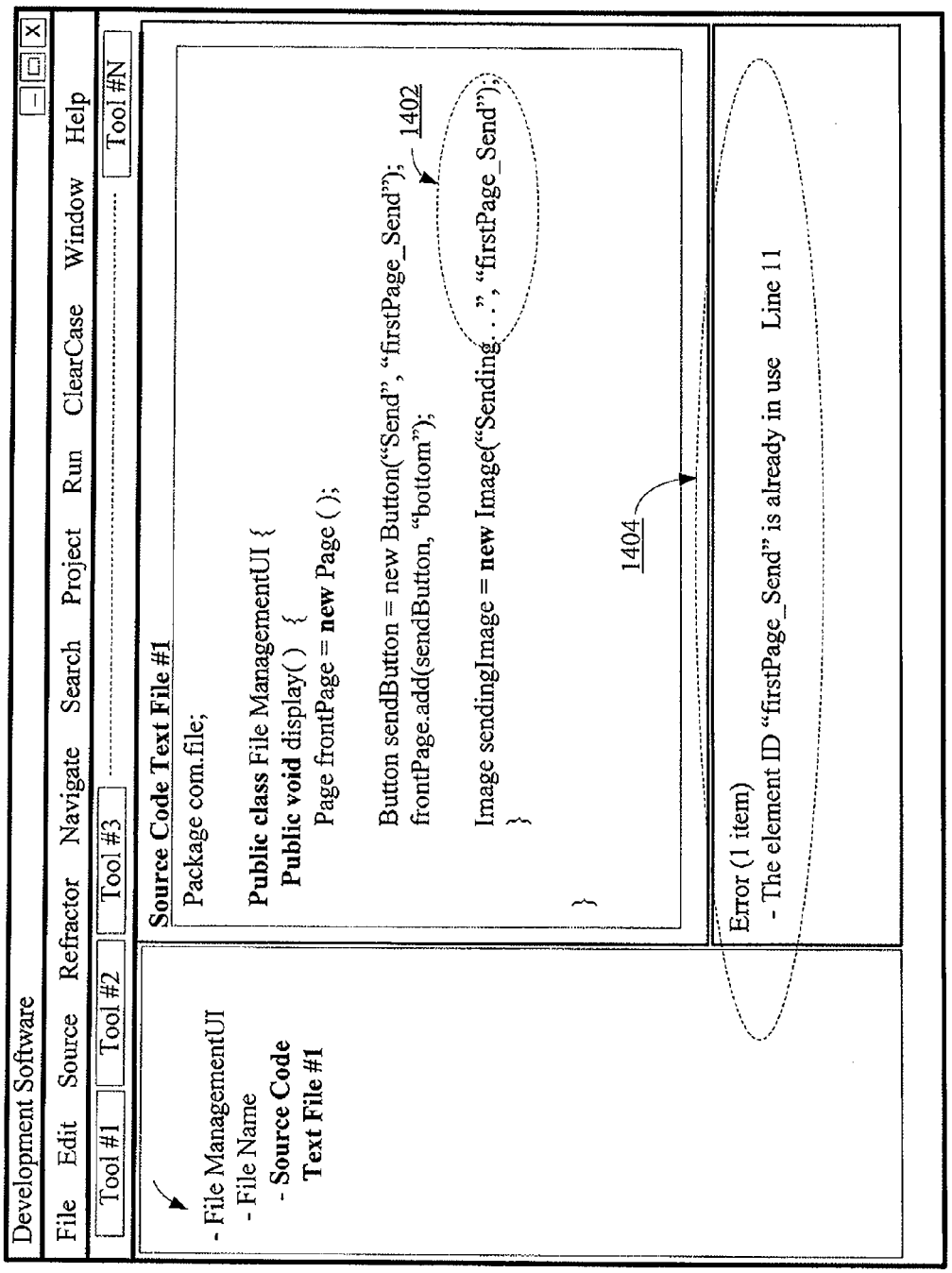
FIG. 14 is a schematic illustration of a GUI with error indicators that is useful for understanding the present invention.

Referring now to FIG. 14, there is provided a schematic illustration of a GUI 1400 that is useful for understanding the present invention. As shown in FIG. 14, the GUI 1400 can be a GUI for a software development application. Embodiments of the present invention are not limited in this regard. The GUI 1400 can be operative to display error indicators 1404 to a user (e.g., a software developer) of a computing device (e.g., the computing device 102 or 106 of FIG. 1) displaying the GUI 1400. As shown in FIG. 14, the error indicator 1404 indicates that two (2) UI elements (e.g., a "Send" button and an image) have been created with the same identifier (e.g., "firstPage_send"). With this error indication feature, the software development application will not allow the user (e.g., a software developer) to build an installable and runable application until this error is resolved. This error indication feature also ensures that UI flagging code will be added to the desirable portions of the code, i.e., the portions relating to a changed, added or removed UI element, to a UI object containing the UI element, and to corresponding UI objects having a "trail" to the UI element.

Although FIG. 14 illustrates a method for showing the duplication of a UI element identifier via a mechanism that prevents compilation of an installable and runable software product, embodiments of the present invention are not limited in this regard. For example, a less severe warning mechanism can alternatively be employed that does not prevent compilation of an installable and runable software product. However, in such a scenario, the resulting GUIs might show UI flagging indicators for UI elements that were not actually changed.

In light of the forgoing description of the invention, it should be recognized that the present invention can be realized in hardware, software, or a combination of hardware and software. A method for UI flagging according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Further-more, to the extent that the terms "including", "includes", "having", "has", "with", or variants thereof are used in either the detailed description and/or the claims, such terms are intended to be inclusive in a manner similar to the term "comprising."

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A computer implemented method for user interface flagging, comprising the acts of:
    editing base language code for a software product by adding new base language code that generates a user interface element of a user interface or modifying existing base language code for changing at least one of a visual characteristic, an auditory characteristic, and a functional characteristic of said user interface element of said user interface;
    setting at least one type of a UI flagging indicator to be used per-change and globally in a software project; and
    adding first UI flagging code to said base language code for setting at least one first visual indicator on or adjacent to said user interface element of said user interface in response to said editing of said base language code, said first visual indicator indicating that a feature of said user interface element has been changed via a modification of said base language code or that said user interface element has been added to a software product via a modification of said base language code;
    wherein said base language code comprises un-compiled code absent of machine language code which can be executed by a computing device.

2. The computer implemented method according to claim 1, wherein the UI flagging code is operative to cause at least one of (a) the user interface element to appear with a select border, (b) text of the user interface element to appear in a select font, (c) the text of the user interface element to flash, (d) the text of the user interface element to appear in a select color, and (e) a sound to be output when the user interface element is clicked.

3. The computer implemented method according to claim 1, further comprising the act of setting at least one second visual indicator on or adjacent to at least one first user interface object containing the user interface element.

4. The computer implemented method according to claim 3, wherein the act of setting at least one second visual indicator includes adding second UI flagging code to the base language code that generates the first user interface object.

5. The computer implemented method according to claim 3, further comprising the act of setting at least one third visual indicator on or adjacent to at least one second user interface object containing the first user interface object or having a trail to the first user interface object.

6. The computer implemented method according to claim 1, further comprising the act of removing a UI flagging setting from a software development project upon a determination that a UI flagging-remove operations have been accessed and run by a user of a computing device.

7. The computer implemented method according to claim 1, further comprising the act of collecting information that is useful for building a record of visual indicators for each build of an application.

8. A computer implemented method for user interface flagging, comprising the acts of:
    editing base language code for a software product so as to remove a user interface element from a first user interface object thereof;
    setting at least one type of a UI flagging indicator to be used per-change and globally in a software project; and
    adding UI flagging code to said base language code for setting at least one first visual indicator on at least said first user interface object in response to said editing of said base language code, said UI flagging code indicating that said user interface element has been removed from said software product via a modification to said base language code thereof;
    wherein said base language code comprises un-compiled code absent of machine language code which can be executed by a computing device.

9. The computer implemented method according to claim 8, wherein the UI flagging code is operative to cause at least one of (a) the first user interface object to appear with a select border, (b) text of the first user interface object to appear in a select font, (c) the text of the first user interface object to flash, (d) the text of the first user interface object to appear in a select color, and (e) a sound to be output when the first user interface object is displayed on a display screen.

10. The computer implemented method according to claim 8, further comprising the act of removing a UI flagging setting from a software development project.

11. The computer implemented method according to claim 8, further comprising the act of setting at least one second visual indicator on or adjacent to at least one second user interface object containing the first user interface object or having a trail to the first user interface object.

12. The computer implemented method according to claim 8, further comprising the act of collecting information that is useful for building a record of visual indicators for each build of an application.

13. A system, comprising:
    at least one processing device configured to:
        edit base language code for a software product by adding new base language code that generates a user interface element of a user interface or modifying existing base language code for changing at least one of a visual characteristic, an auditory characteristic, and a functional characteristic of said user interface element of said user interface;
        setting at least one type of a UI flagging indicator to be used per-change and globally in a software project; and
        adding first UI flagging code to said base language code for setting at least one first visual indicator on or adjacent to at least one user interface element of said user interface in response to editing of said base language code, said first visual indicator indicating that a feature of said user interface element has been changed via a modification of said base language code or that said user interface element has been added to a software product via a modification of said base language code;
    wherein said base language code comprises un-compiled code absent of machine language code which can be executed by a computing device.

14. The system according to claim 13, wherein the processing device is further configured to set at least one second visual indicator on at least said first user interface object of the software application when base language code that generates the first user interface object has been modified so as to remove the user interface element from the first user interface object.

15. The system according to claim 14, wherein the second visual indicator is set by adding second UI flagging code to the base language code that generates the first user interface object.

16. The system according to claim 13, wherein the processing device is further configured to collect information that is useful for building a record of visual indicators for each build of an application.

17. The system according to claim 13, wherein the processing device is further configured to remove a UI flagging setting from a software development project.

18. A machine-readable medium having stored thereon instructions, which when executed by a machine, cause the machine to perform the following operations comprising:
    editing base language code for a software product by adding new base language code that generates a user interface element of a user interface or modifying existing base language code for changing at least one of a visual characteristic, an auditory characteristic, and a functional characteristic of said user interface element of said user interface;
    setting at least one type of a UI flagging indicator to be used per-change and globally in a software project; and
    adding first UI flagging code to said base language code for setting at least one first visual indicator on or adjacent to at least said user interface element of said user interface in response to said editing of said base language code, said first visual indicator indicating that a feature of said user interface element has been changed via a modification of said base language code or that said user interface element has been added to a software product via a modification of said base language code;
    wherein said base language code comprises un-compiled code absent of machine language code which can be executed by a computing device.

* * * * *